US009102313B2

(12) United States Patent
Bissontz

(10) Patent No.: US 9,102,313 B2
(45) Date of Patent: Aug. 11, 2015

(54) SUPERVISORY CONTROL SYSTEM FOR HYBRID-ELECTRIC POWERTRAINS

(75) Inventor: Jay E. Bissontz, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/119,952

(22) PCT Filed: Jun. 17, 2011

(86) PCT No.: PCT/US2011/040889
§ 371 (c)(1),
(2), (4) Date: Nov. 25, 2013

(87) PCT Pub. No.: WO2012/173630
PCT Pub. Date: Dec. 20, 2012

(65) Prior Publication Data
US 2014/0136038 A1    May 15, 2014

(51) Int. Cl.
| | |
|---|---|
| *G06F 7/00* | (2006.01) |
| *B60W 10/06* | (2006.01) |
| *B60W 50/02* | (2012.01) |
| *B60W 20/00* | (2006.01) |
| *B60L 11/18* | (2006.01) |
| *B60W 10/08* | (2006.01) |

(Continued)

(52) U.S. Cl.
CPC ............ *B60W 10/06* (2013.01); *B60L 11/1866* (2013.01); *B60W 10/08* (2013.01); *B60W 10/26* (2013.01); *B60W 20/00* (2013.01); *B60W 50/0205* (2013.01); *B60W 30/192* (2013.01); *B60W 2050/0006* (2013.01); *B60W 2050/021* (2013.01); *Y02T 10/7005* (2013.01); *Y02T 10/7061* (2013.01); *Y10S 903/93* (2013.01)

(58) Field of Classification Search
None
See application file for complete search history.

(56) References Cited

U.S. PATENT DOCUMENTS 7,193,392 B2 *   3/2007   King et al. ................... 320/118
7,904,217 B2     3/2011   Miller (Continued)

FOREIGN PATENT DOCUMENTS

| EP | 2043221 A2 | 4/2009 |
|---|---|---|
| WO | 2012/173630 | 12/2012 |

OTHER PUBLICATIONS

Office Action From Corresponding Swedish Application, No. 1450002-9.

*Primary Examiner* — John R Olszewski
*Assistant Examiner* — Jess Whittington
(74) *Attorney, Agent, or Firm* — Jeffrey P. Calfa; Mark C. Bach

(57) ABSTRACT

A method of operating a vehicle with hybrid-electric powertrain having an engine, a generator, and a battery is provided. A vehicle start input signal is received from an operator interface. A master controller initiates after receiving input from the operator interface. A secondary controller initiates after starting initiation of the master controller. A battery pack cell voltage balancing test is performed utilizing the master controller. Voltage within the battery pack cells is balanced based upon the balancing test. An isolation contactor closes after balancing the voltage within the battery pack. A signal from the master controller to the secondary controller to begin operation is generated after closing the isolation contactor. Alternately, voltage within the battery pack cells based upon results of the balancing test may take place dynamically during vehicle operation after closure of the isolation contactor.

7 Claims, 4 Drawing Sheets

(51) Int. Cl.
 *B60W 10/26* (2006.01)
 *B60W 30/192* (2012.01)
 *B60W 50/00* (2006.01)

(56) References Cited

U.S. PATENT DOCUMENTS

| | | |
|---|---|---|
| 8,489,254 B2 | 7/2013 | Bissontz |
| 8,742,615 B2 * | 6/2014 | Gopalakrishnan et al. .... 307/9.1 |
| 2007/0120529 A1 * | 5/2007 | Ishikawa et al. ............. 320/119 |
| 2008/0086247 A1 * | 4/2008 | Gu et al. ......................... 701/36 |
| 2009/0091332 A1 * | 4/2009 | Emori et al. .................. 324/537 |
| 2009/0248228 A1 * | 10/2009 | Miller ............................ 701/22 |
| 2010/0026235 A1 * | 2/2010 | Harris ........................... 320/101 |
| 2010/0321025 A1 * | 12/2010 | Lin et al. ....................... 324/427 |
| 2012/0139491 A1 * | 6/2012 | Eberhard et al. .............. 320/118 |
| 2013/0175857 A1 * | 7/2013 | Shreevani et al. ............. 307/9.1 |
| 2013/0197780 A1 | 8/2013 | Oehlerking |

* cited by examiner

SUPERVISORY CONTROL SYSTEM FOR HYBRID-ELECTRIC POWERTRAINS

TECHNICAL FIELD

The present disclosure relates to a control system for a hybrid-electric powertrain, and more particularly to a control system for a hybrid-electric powertrain that controls initiation, battery testing, and de-initiation of the hybrid-electric powertrain.

BACKGROUND

Many vehicles now utilize hybrid-electric powertrains in order to increase the efficiency of the vehicle. Hybrid-electric powertrains typically improve overall vehicle fuel efficiency by allowing supplementing an internal combustion engine with electric motors, such that less power output is required of the internal combustion engine, as power from the electric motors may also be utilized in situations when maximum powertrain output is required, such as acceleration, or climbing a grade. Additionally, hybrid-electric powertrains may be utilized to power equipment mounted to a vehicle, such as, for example, a lift, an auger, a post hole digger, a crane, or other known equipment that may be utilized when a vehicle is not in motion. Such power equipment may be powered through a power take off ("PTO") that may be driven by electric motors of the hybrid-electric powertrain to reduce the time an internal combustion engine is operated.

The initiation and de-initiation, or startup and shutdown, of the electrical systems in a vehicle having a hybrid-electric powertrain presents issues not experienced previously. For instance, during initiation of electrical systems, simply transitioning high-voltage isolation contactors from an open state, which prevents the flow of electricity, to a closed state, which allows the flow of electricity, upon activation of a vehicle's key, may cause a rapid uncontrolled free flow of electrical energy that may damage system components. For example, design limits of system components may be exceeded by rapid loading of electrical energy, thereby damaging the system components. Similarly, when electrical systems are de-initiated, premature component failure or excessive battery discharge may occur if the flow of electrical energy is suddenly stopped.

Further, in addition to initiation and de-initiation of the electrical systems, voltage of individual cells in batteries of the hybrid-electric powertrain needs to be balanced to allow the electrical system to function as intended and to allow the battery packs to offer performance and life cycle that is acceptable. If voltage of the individual battery cells is not kept within a certain range, battery pack life may be adversely affected, and electrical systems may not have sufficient voltage if one of the individual cells in a battery pack is not as charged as the rest of the cells. Previous efforts to provide battery management systems focused on either balancing voltage within the battery cells after the vehicle had been shut off, which can drain the battery packs to a level to prevent the vehicle from starting, or the battery management system is active during operation of the hybrid-electric powertrain, which makes it increasingly difficult to balance the battery packs as electric loads are constantly varying the voltage within the battery packs.

Therefore, a need exists for a control system that controls the initiation, de-initiation, and battery management system for an electrical system of a vehicle having a hybrid-electric powertrain.

SUMMARY

According to one process, a method of operating a vehicle with hybrid-electric powertrain having an internal combustion engine, a generator, and a battery is provided. A vehicle start input signal is received from an operator interface. A master controller initiates after receiving the input from the operator interface. At least one secondary controller initiates after starting the initiation of the master controller. A high-voltage battery pack cell voltage balancing test is performed utilizing the master controller. Voltage within the high-voltage battery pack cells is balanced based upon results of the high-voltage battery pack cell voltage balancing test. A high-voltage isolation contactor closes after balancing the voltage within the high-voltage battery pack. A signal from the master controller to the at least one secondary controller to begin operation is generated after closing the high-voltage isolation contactor. The balancing of the high voltage batteries also occurs dynamically during normal vehicle operation. The high voltage battery cell voltage "test" occurs before the pre-charge contactors and main isolation contactors close. The "test" is a momentary look/glimpse by the BMS at the high voltage battery cells to determine their state of charge (SOC), which becomes a fixed point of reference in order to later direct more or less electrical potential to a given cell during dynamic vehicle operation.

According to another process, a method of operating a vehicle with hybrid-electric powertrain having an internal combustion engine, a generator, and a battery, is provided. A shut-down signal input is provided from an operator interface. A master controller determines a current amount of electrical activity of the hybrid-electric powertrain. Electrical activity of the hybrid-electric powertrain is reduced by transmitting a control signal from the master controller to at least one secondary controller. A high-voltage isolation contactor opens once the electrical activity of the hybrid-electric powertrain reaches a predetermined threshold. A high-voltage battery pack cell voltage balancing test is performed utilizing the master controller. Voltage within the high-voltage battery pack is balanced based upon results of the high-voltage battery pack cell voltage balancing test. The at least one secondary controller is placed into a sleep mode. The master controller is placed into a sleep mode after the at least one secondary controller enters into the sleep mode. The hybrid-electric powertrain shuts-down once the master controller enters into the sleep mode.

According to a further process, a method of balancing voltage within cells of a high-voltage battery pack of a vehicle having hybrid-electric powertrain is provided. It is determined if a high-voltage electrical system discharge rate is between a first limit and a second limit. It is determined if a low-voltage electrical system discharge rate is between a third limit and a fourth limit. A high-voltage isolation contactor transitions from a first state to a second state. An amount of voltage is determined in a plurality of cells of a high-voltage battery back. An amount of voltage in the plurality of cells of the high-voltage battery pack is balanced.

As described above, the Supervisory Control System for Hybrid-Electric Powertrains and a vehicle made with this system provide a number of advantages, some of which have been described above and others of which are inherent in the invention. Also, modifications may be proposed to the Supervisory Control System for Hybrid-Electric Powertrains or a vehicle made with this system without departing from the teachings herein.

DETAILED DESCRIPTION

Figure 1:
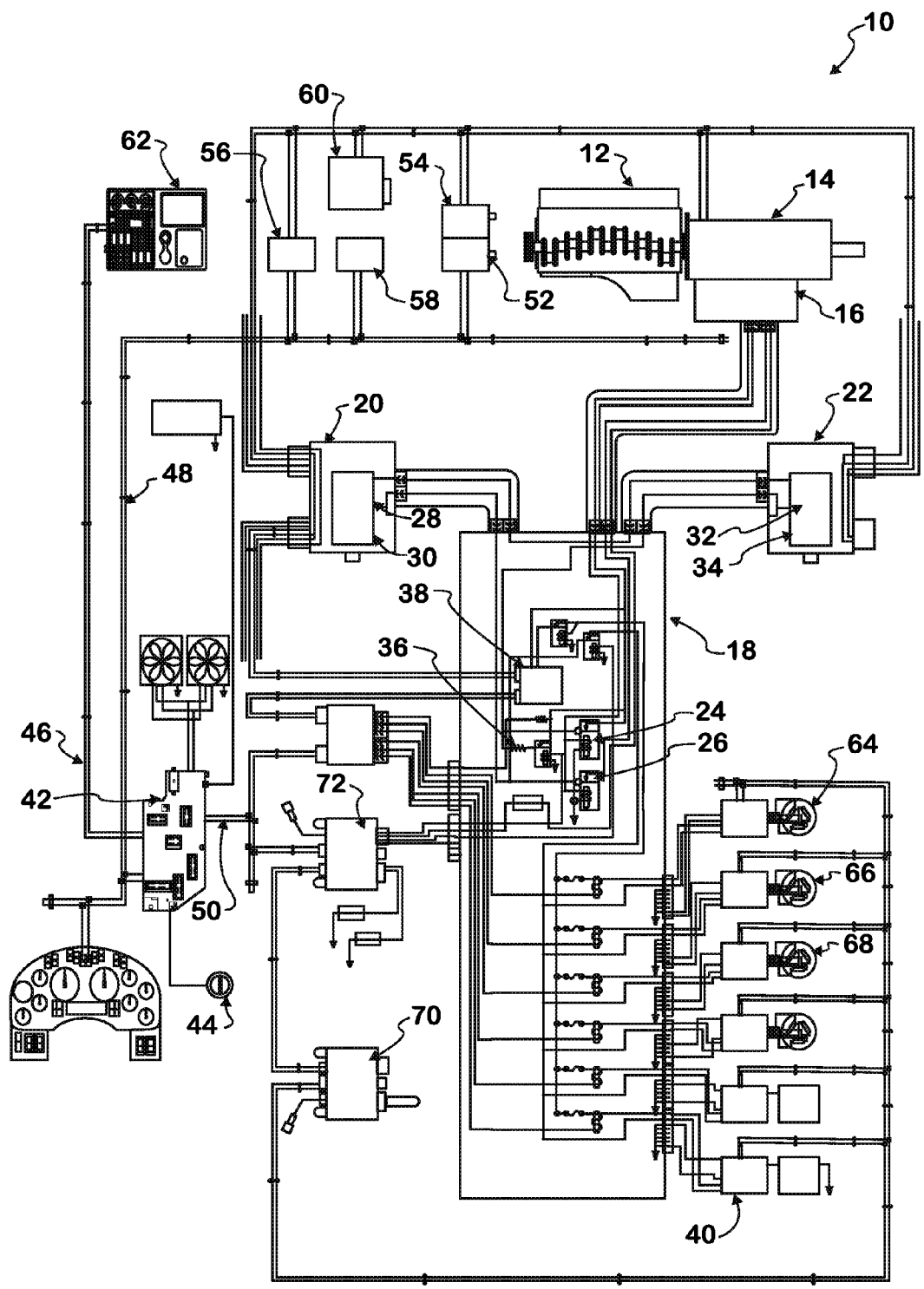
FIG. 1 is a schematic diagram showing a vehicle having a hybrid-electric powertrain.

Referring now to the figures and in particular to FIG. 1, a schematic diagram of a vehicle having a hybrid-electric powertrain 10 is depicted. The hybrid-electric powertrain 10 comprises an internal combustion engine 12 and a hybrid-electric system 14 that is coupled to the internal combustion engine 12. The hybrid-electric system 14 may comprise an electric motor and generator adapted to function as a generator and generate electrical power when being driven by the internal combustion engine, and also is capable of functioning as an electric motor when being powered by first and second high-voltage battery packs 20, 22. A hybrid motor controller 16 is coupled to the hybrid-electric system 14 to control the function of the hybrid-electric system 14 as either a motor or a generator.

The hybrid motor controller 16 is electrically coupled to a high-voltage distribution box 18. The high-voltage distribution box 18 is adapted to control the distribution of electrical energy to and from the hybrid system 16, the first high-voltage battery pack 20, the second high-voltage battery pack 22, and electrically powered components of the vehicle. The high-voltage distribution box 18 comprises a first isolation contactor 24 and a second isolation contactor 26. The first isolation contactor 24 and the second isolation contactor 26 may be transitioned between an open position, preventing flow of electricity, and a closed position, allowing flow of electricity.

The first high-voltage battery pack 20 includes at least one high-voltage battery cell 28 and battery management system ("BMS") circuit 30. The at least one high-voltage battery cell 28 stores electrical energy utilized by the hybrid-electrical system 14. The BMS circuit 30 is utilized to test the state of the first battery pack 20 and to balance voltage within high-voltage battery cell 28 of the first high-voltage battery pack 20 and other high-voltage battery cells, both within the first high-voltage battery pack 20, and in other high-voltage battery packs, such as the second high-voltage battery pack 22.

The second high-voltage battery pack 22 includes at least one high-voltage battery cell 32 and a BMS circuit 34. The second high-voltage battery pack 22 is generally identical to the first high-voltage battery pack 20.

The BMS circuits 30, 34 allow-voltage within the high-voltage battery cells 28, 32 to be measured when there is no load on the electrical system, such as when the first and second isolation contactors 24, 26 are in an open position. Once the voltage in the high-voltage battery cells 28, 32 has been measured, the voltage within each cell 28, 32 may be equalized, as a battery pack 20, 22 may typically only output as much electrical power as that found in the least charged cell of the battery pack 20, 22.

The high-voltage distribution box 18 additionally includes a pre-charge resistor circuit 36. The pre-charge resistor circuit 36 may be utilized to determine an amount of electrical current flowing through the high-voltage distribution box 18. The role of the pre-charge resistor circuit 36 is to reduce or prevent a free flow of electrical energy to all components of the vehicle's electrical architecture. Such rapid uncontrolled free flow of electrical energy places heavy, rapid loads on electrical components at rates possibly exceeding their design limits, contributing to undue or premature failure of these components. A DC to DC converter 38 is also provided within the high-voltage distribution box 18. The DC to DC converter 38 is adapted to convert the high-voltage output from the first battery pack 20 and the second battery pack 22 to a lower voltage for use with low-voltage electrical system, such as those typically found to power electrical accessories in a vehicle. In addition to the DC to DC converter 38 found in the high-voltage distribution box 18, a second DC to DC converter 40 may also be provided.

An electronic system controller ("ESC") 42 is also provided. The ESC 42 acts as a master controller for the electrical system of the hybrid-electric powertrain 10. The ESC 42 is electrically coupled to an operator interface 44, such as an ignition key. The operator interface 44 allows a user to indicate that the hybrid-electric powertrain 10 should initiate, or start-up, by placing the operator interface 44 into a start position. Similarly, the operator interface 44 also allows a user to indicate that the hybrid-electric powertrain should de-initiate, or shut-down, by placing the operator interface 44 into an off position.

The ESC 42 is electrically coupled via control networks 46, 48, 50 to a number of secondary controllers, and electrical devices. For instance, a powertrain control network 48 may electrically couple the ESC 42 with an electronic control module ("ECM"), or electronic control unit ("ECU"), 52, a hybrid control unit ("HCU") 54, and transmission control unit ("TCU") 56, an anti-lock brake system control unit ("ABS") 58, and a regenerative braking system 60. The powertrain control network 48 may operate according to SAE standard J1939.

The ESC 42 is also coupled to a dash control panel 62 via a dash control network 46. The dash control network 46 may operate according to SAE standard J1708.

Finally, the ESC 42 is coupled via hybrid control network 50. The hybrid control network 50 may operate according to SAE standard J1939. The hybrid control network 50 comprises a pneumatic compressor controller 64, a power steering controller 66, and an HVAC controller 68. The pneumatic compressor controller 64, the power steering controller 66, and the HVAC controller 68 are all also electrically coupled to the high-voltage distribution box 18, to receive power. The hybrid control network 50 also comprises a first remote power module ("RPM") 70 and a second RPM 72. The first RPM 70 and the second RPM 72 are adapted to control various equipment of a vehicle having a hybrid-electric powertrain, such as a lift, or a hydraulically driven component like an auger. The hybrid control network 50 additional comprises the first high-voltage battery pack 20 and the second high-voltage battery pack 22. Thus, the hybrid control network 50 allows the ESC 42 to be electrically connected to a number of controllable components of the hybrid-electric powertrain 10.

Figure 2:
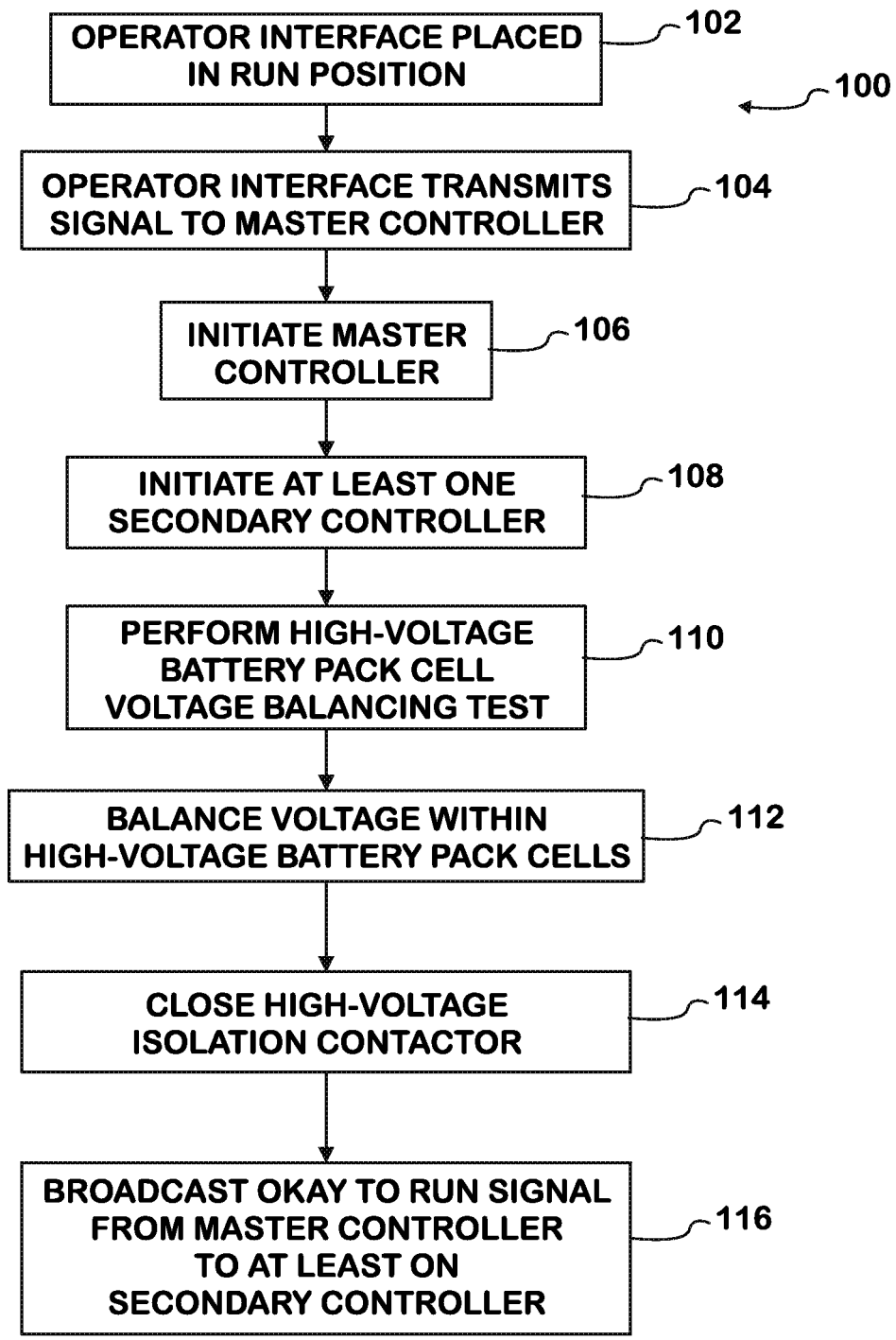
FIG. 2 is a flow chart showing the initialization process of an electrical system of a vehicle having a hybrid-electric powertrain.

Turning now to FIG. 2, a flow chart of the initialization process 100 of an electrical system of a vehicle having the hybrid-electric powertrain 10 is shown. The initialization process 100 begins when a user places an operator interface into an operating position as shown at block 102. The operator interface generates a signal that is transmitted to an ESC, also referred to as a master controller at block 104 indicating that operator interface has been placed into an operating position. The master controller then initiates its operation at block 106.

Once the master controller begins its initiation, at least one secondary controller, such as a pneumatic compressor controller, also begins to initiate, as shown at block 108.

A high-voltage battery pack cell voltage balancing test is performed at block 110. The high-voltage battery pack cell voltage balancing test includes the master controller broadcasting a signal to the secondary controllers to remain in a state of minimal power consumption, or no power consumption, until the high-voltage battery pack cell voltage balancing test is complete. The high-voltage battery pack cell voltage balancing test is conducted with the high-voltage isolation contactor in an open position, preventing the flow of electrical current from a high-voltage battery pack. Performing the high-voltage battery pack cell voltage balancing test with the high-voltage isolation contactor in the open position provides a more stable voltage environment. The voltage within the cells of the battery pack or packs is then balanced by either discharging cells with an excess voltage, or to charge any cells with a voltage lower than the desired voltage, or a combination of the two may be utilized.

Next, current from the high-voltage battery pack may be provided to a DC to DC converter for use with the vehicle's low-voltage electrical system. The master controller further initiates a high-voltage pre-charge cycle, where the master controller monitors current flow in the both the high-voltage electrical system and the low-voltage electrical system. The current flow in both the high-voltage electrical system must be between an upper current limit and a lower current limit. Further, the current flow in the high-voltage electrical system must remain between the upper current limit and the lower current limit for a predetermined time. Similarly, the low-voltage electrical system must also have a current flow that is between an upper current limit and a lower current limit for a predetermined time. The upper and lower current limits and the predetermined time may vary based upon the application of the vehicle.

Once the high-voltage battery pack cell voltage balancing test, and pre-charge cycle indicates that the high-voltage and low-voltage current flows are within the predefined current limits, a high-voltage isolation contactor may be transitioned from an open position to a closed position as seen in block 114. Finally, the master controller broadcasts a signal to the secondary controllers that they may begin operating as shown at block 116.

Alternatively, once the high-voltage battery pack cell voltage balancing test performed at block 110 is complete, the balancing step may be skipped, and the master controller may proceed to initiate the pre-charge cycle of the high and low voltage systems. Once the high-voltage battery pack cell voltage balancing test and pre-charge cycle indicates that the high-voltage and low-voltage current flows are within the predefined current limits, the high-voltage isolation contactor may be transitioned from an open position to a closed position as seen in block 114. Balancing of the voltage within the cells of the battery pack or packs is then balanced dynamically during operation of the vehicle by either discharging cells with an excess voltage or charging cells with deficient voltage, or by a combination of both.

Figure 3:
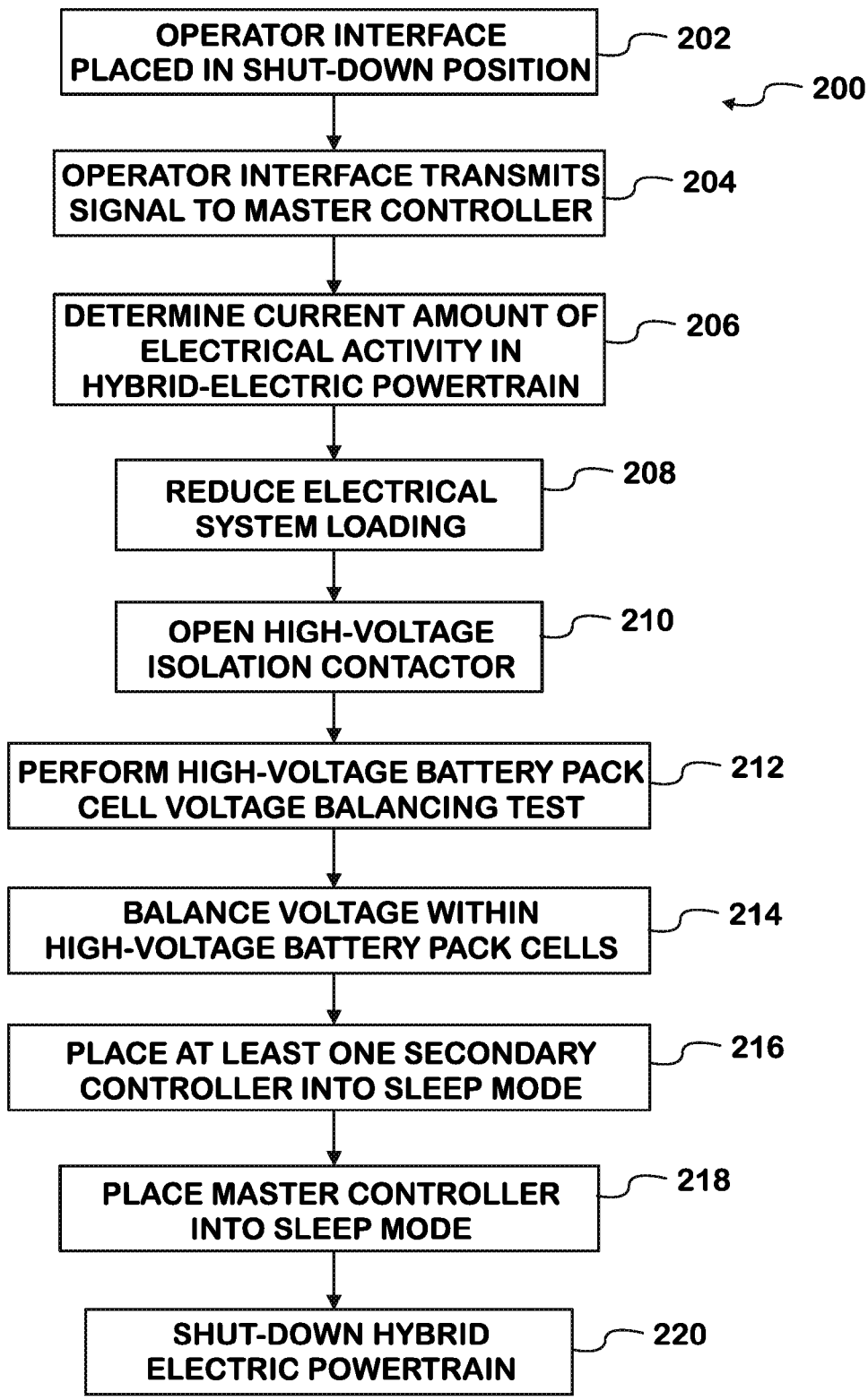
FIG. 3 is a flow chart showing the de-initiation process of an electrical system of a vehicle having a hybrid-electric powertrain.

FIG. 3 depicts a flowchart of the shutdown process 200 of an electrical system of a vehicle having the hybrid-electric powertrain 10. The shutdown process 200 begins when a user places an operator interface, or user interface, into a shutdown position as shown at block 202. The operator interface generates a signal that is transmitted to an ESC, also referred to as a master controller at block 204 indicating that the operator interface has been placed into an operating position. The master controller then determines an amount of electrical activity in the hybrid-electric powertrain at block 206. The master controller reduces the electrical activity within the hybrid-electric powertrain until the total level of electrical activity falls below a predetermined shutdown threshold, as shown at block 208. Once the electrical activity is below the predetermine shutdown threshold, a high-voltage isolation contactor is transitioned from a closed state to an open state at block 210.

A high-voltage battery pack cell voltage balancing test is performed at block 212. The high-voltage battery pack cell voltage balancing test includes the master controller broadcasting a signal to the secondary controllers to remain in a state of minimal or no power consumption until the high-voltage battery pack cell voltage balancing test is complete. The high-voltage battery pack cell voltage balancing test is conducted with the high-voltage isolation contactor in an open position, preventing the flow of electrical current from a high-voltage battery pack. Performing the high-voltage battery pack cell voltage balancing test with the high-voltage isolation contactor in the open position provides a more stable voltage environment. The voltage within the cells of the battery pack or packs is then balanced at block 214 by either discharging cells with an excess voltage, or by charging any cells with a voltage lower than the desired voltage, or a combination of the two may be utilized. Alternatively, the balancing of the high voltage batteries may occur dynamically during the next or subsequent vehicle operation cycle. In this scenario, the high-voltage battery pack cell voltage balancing test functions as a momentary look by the BMS at the high voltage battery cells to determine their state of charge (SOC). This SOC becomes a fixed point of reference in order to direct more or less electrical potential to a given cell during dynamic vehicle operation the next time the vehicle is operated. In other words, the BMS remembers the ending cell SOC for use during a subsequent re-initialization of the system.

Finally, the master controller signals the secondary controllers to enter into a sleep mode at block 216. The sleep mode stops activity on the control network between the secondary controllers and the master controller. The master controller enters into a sleep mode at block 21, and the entire hybrid-electric powertrain is shutdown at block 220.

Figure 4:
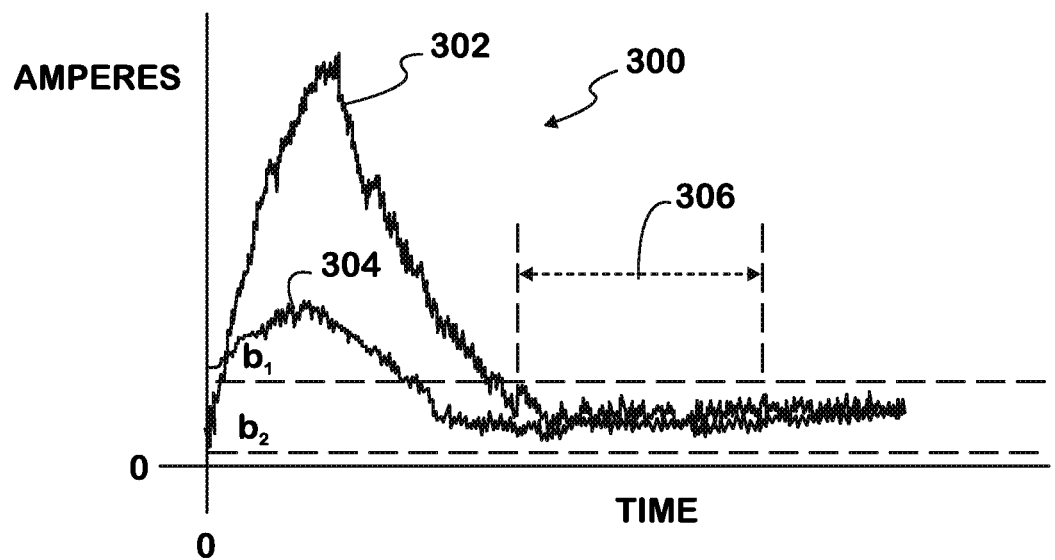
FIG. 4 is a graph showing current flow before a battery management system is utilized during initiation of an electrical system of a vehicle having a hybrid-electric powertrain.

FIG. 4 shows a current chart 300 indicating an amount of current flowing from a high-voltage electrical system 302 as well as an amount of current flowing from a low-voltage electrical system 304 prior to initiation of the ESC and any additional controllers. An upper current limit b1 is shown as is a lower current limit b2. As shown in FIG. 4, the upper current limit b1 and the lower current limit b2 are shown as being identical for both the current flow from the high-voltage electrical system 302 and the current flow from the low-voltage electrical system 304, however, it is contemplated that different limits may be utilized. A preset time frame 306 is also shown in FIG. 4. The preset time frame 306 provides assurance that the current flow from the high-voltage electrical system 302 and the current flow from the low-voltage electrical system 304 remain within the upper current limit b1 and the lower current limit b2 for a sufficient period of time to indicate that the operation of the hybrid-electric powertrain has stabilized and it is unlikely that damage will be caused by a transition of an isolation contactor to a closed position to allow current to flow from a high-voltage distribution box.

Figure 5:
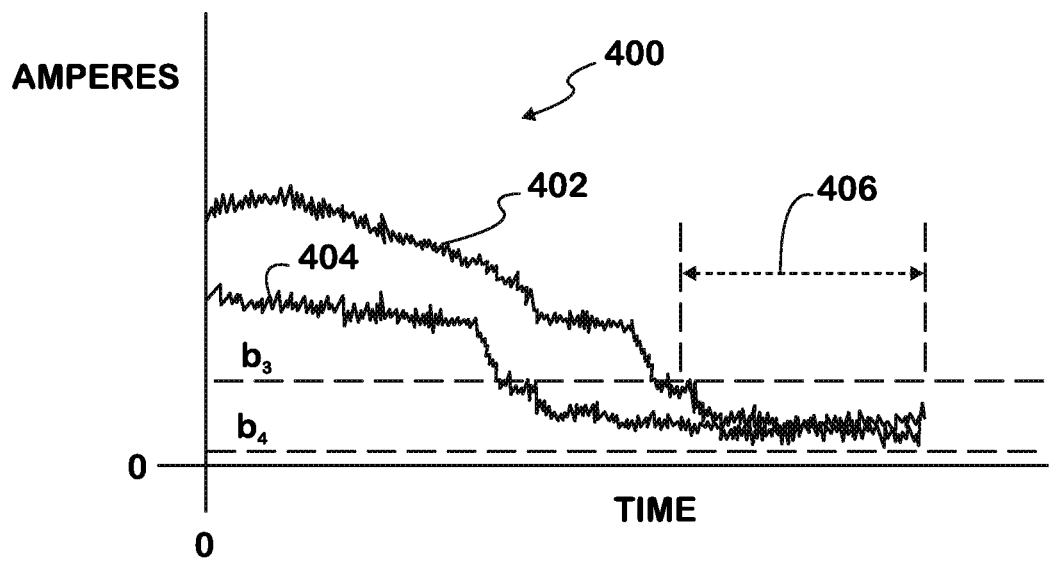
FIG. 5 is a flow chart showing current flow before a battery management system is utilized during de-initiation of an electrical system of a vehicle having a hybrid-electric powertrain.

Similarly, FIG. 5 shows a current chart 400 indicating an amount of current flowing from a high-voltage electrical system 402 as well as an amount of current flowing from a low-voltage electrical system 404 prior to shut-down of the ESC and any additional controllers. An upper current limit b3 is shown as is a lower current limit b4. As shown in FIG. 5, the upper current limit b3 and the lower current limit b4 are shown as being identical for both the current flow from the high-voltage electrical system 402 and the current flow from the low-voltage electrical system 404, however, it is contemplated that different limits may be utilized. In one embodiment, the high voltage current and low voltage current levels do not need to be identical, but both the high voltage current and low voltage current levels need to be within the "deadband" range created between b3 and b4. A preset time frame 406 is also shown in FIG. 5. The preset time frame 406 provides assurance that the current flow from the high-voltage electrical system 402 and the current flow from the low-voltage electrical system 404 remain within the upper current limit b3 and the lower current limit b4 for a sufficient period of time to indicate that the operation of the hybrid-electric powertrain has stabilized and it is unlikely that damage will be caused by transitioning an isolation contactor to an open position to stop current flow from a high-voltage distribution box.

It will be understood that a control system may be implemented in hardware to effectuate the method. The control system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the control system is implemented in software, it should be noted that the control system can be stored on any computer readable medium for use by or in connection with any computer related system or method. In the context of this document, a computer-readable medium can be any medium that can store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

While specific embodiments have been described in detail in the foregoing detailed description and illustrated in the accompanying drawings, those with ordinary skill in the art will appreciate that various permutations of the invention are possible without departing from the teachings disclosed herein. Accordingly, the particular arrangements disclosed are meant to be illustrative only and not limiting as to the scope of the invention, which is to be given the full breadth of the appended claims and any and all equivalents thereof. Other advantages to a Supervisory Control System for Hybrid-Electric Powertrains and a vehicle made with this system may also be inherent in the invention, without having been described above.

What is claimed is:

1. A method of operating a vehicle with hybrid-electric powertrain having an internal combustion engine, a generator, and a battery, the method comprising: receiving a vehicle start input signal from an operator interface; initiating a master controller after receiving the input from the operator interface; initiating at least one secondary vehicle subsystem controller after starting the initiation of the master controller; performing a high-voltage battery pack cell voltage balancing test utilizing the master controller; wherein monitoring a current flow within a high-voltage portion of the hybrid-electric powertrain; determining if the current flow within the high-voltage portion is within a predefined range of current flows; and performing the high-voltage battery pack cell voltage balancing test only if the current flow within the high-voltage portion is within the predefined range of current flows; balancing voltage within the high-voltage battery pack cells based upon results of the high-voltage battery pack cell voltage balancing test; closing a high-voltage isolation contactor after balancing the voltage within the high-voltage battery pack; and generating a signal from the master controller to the at least one secondary vehicle subsystem controller to begin operation after closing the high-voltage isolation contactor.

2. The method of claim 1, wherein the determining if the current flow within the high-voltage portion is within a predefined range of current flows includes a preset time frame that the current flow remains within the predefined range of current flows.

3. The method of claim 1, wherein the high-voltage battery pack cell voltage balancing test is performed after initiating additional vehicle subsystem controllers.

4. The method of claim 1, further comprising:
transmitting a signal indicative of current flow from the high-voltage battery pack after completing the high-voltage battery pack cell voltage balancing test.

5. The method of claim 1, wherein the signal from the master controller to the additional vehicle subsystem controllers to begin operation after closing the high-voltage isolation contactor occurs from about 1100 ms to about 1600 ms after receiving an input from the operator interface indicative of a desire to start the vehicle.

6. A method of operating a vehicle with hybrid-electric powertrain having an internal combustion engine, a generator, and a battery, the method comprising: receiving a vehicle start input signal from an operator interface; initiating a master controller after receiving the input from the operator interface; initiating at least one secondary vehicle subsystem controller after starting the initiation of the master controller; performing a high-voltage battery pack cell voltage balancing test utilizing the master controller; wherein monitoring a current flow within a low-voltage portion of the hybrid-electric powertrain; determining if the current flow within the low-voltage portion is within a predefined range; and performing the high-voltage battery pack cell voltage balancing test only if the current flow within the low-voltage portion is within the predefined range; balancing voltage within the high-voltage battery pack cells based upon results of the high-voltage battery pack cell voltage balancing test; closing a high-voltage isolation contactor after balancing the voltage within the high-voltage battery pack; and generating a signal from the master controller to the at least one secondary vehicle subsystem controller to begin operation after closing the high-voltage isolation contactor.

7. The method of claim 6, wherein the determining if the current flow within the low-voltage portion is within a predefined range of current flows includes a preset time frame that the current flow remains within the predefined range of current flows.

\* \* \* \* \*